2,113,692

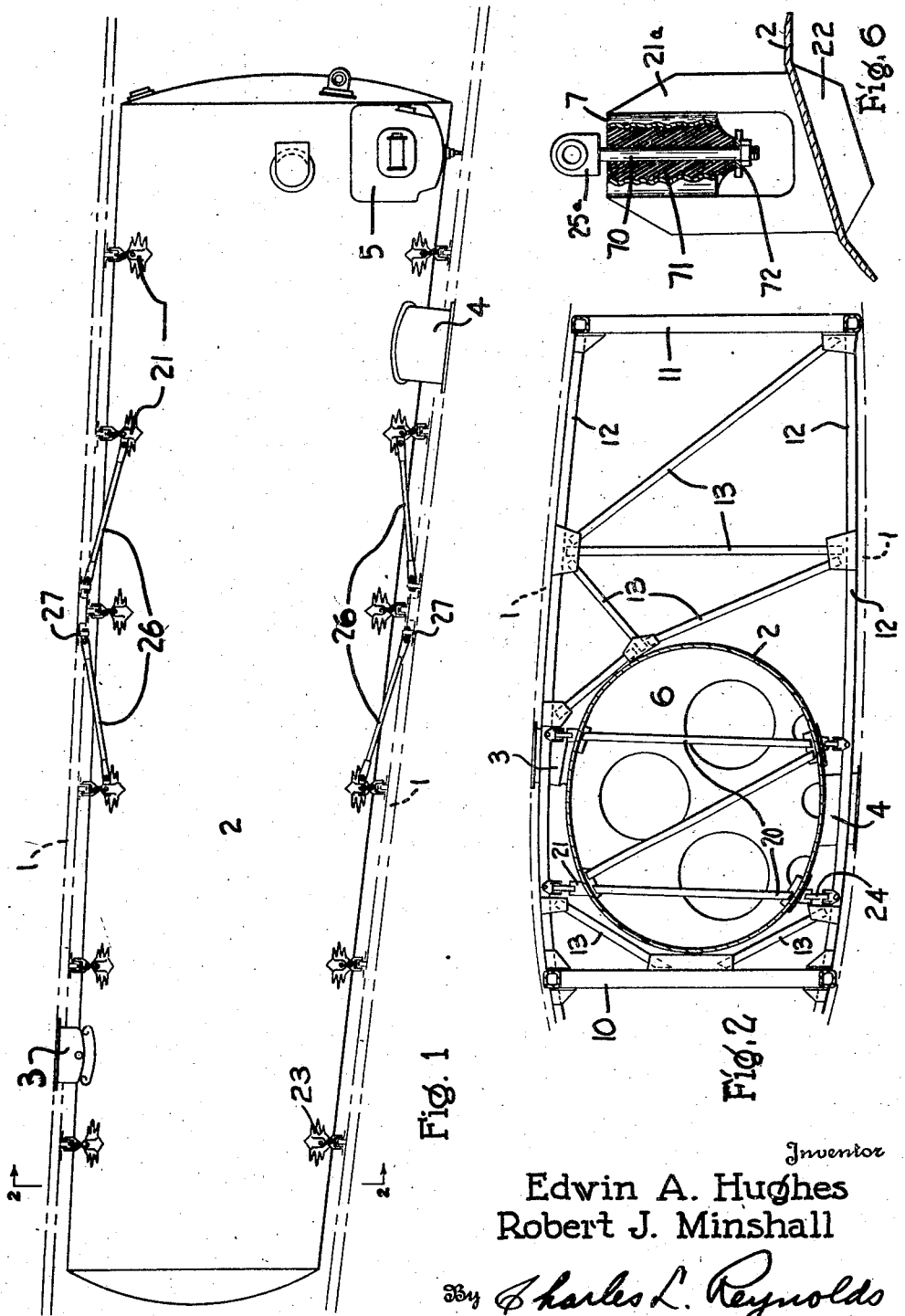

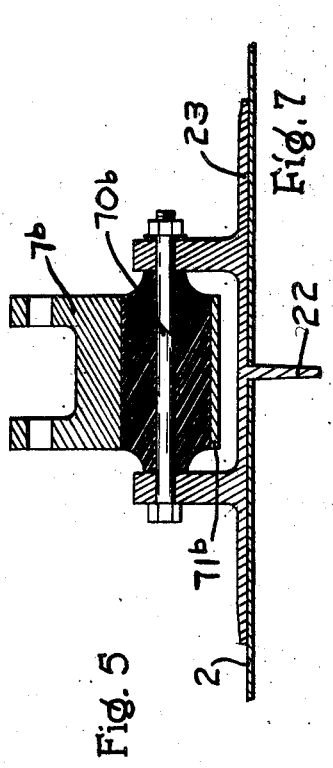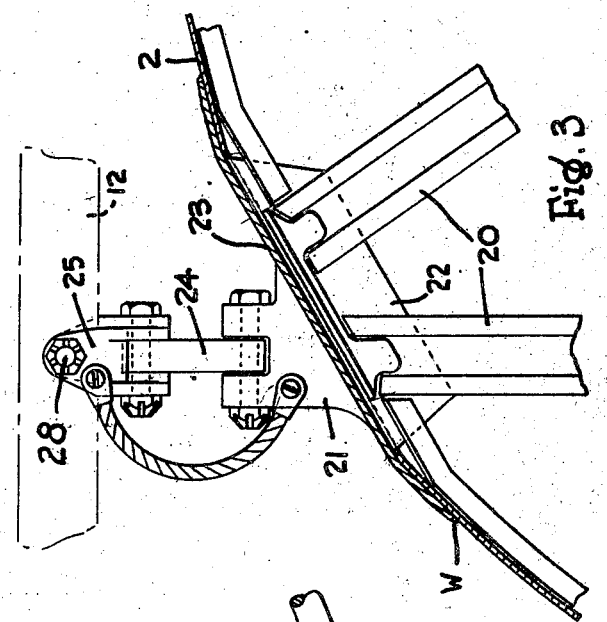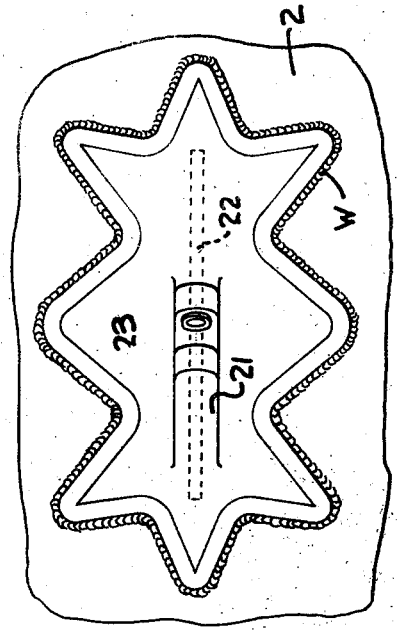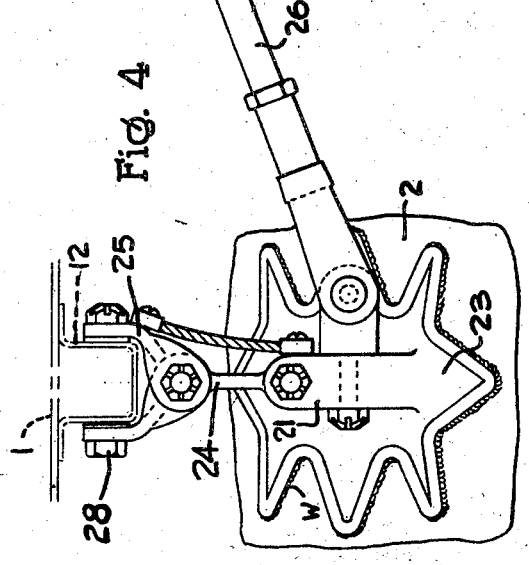
Inventor
Edwin A. Hughes
Robert J. Minshall Patented Apr. 12, 1938

UNITED STATES PATENT OFFICE 2,113,692

FUEL TANK FOR AIRCRAFT

Edwin A. Hughes and Robert J. Minshall, Seattle, Wash., assignors to Boeing Aircraft Company, Seattle, Wash., a corporation of Washington Application May 28, 1936, Serial No. 82,240

12 Claims. (Cl. 244—135)

Our invention relates to aircraft structure, and is more particularly concerned with the problem of supporting a tank—a fuel tank, for instance—within an internally braced structure—as a wing—without appreciably lessening the strength of the structure and without producing undesirable stresses in the tank, especially its skin, such as might tend to cause leakage. A further problem is to support such a tank, of large capacity, and most economically and strongly built of round or near-round cross section, in a way to meet the requirements of the first problem, yet in a way permitting its ready removal as a unit, when required, and the substitution of another tank.

In the modern airplane the space in the fuselage is largely devoted to cargo and passenger space wherever possible. If the fuel tank must be carried in the fuselage, the passenger compartment must ordinarily be made smaller to the prejudice of the passengers' comfort, and lessening the pay load. Furthermore, fuel tanks carried in the fuselage increase the risk of fire as a source of danger to the passengers in case the plane crashes. In addition to these considerations the modern transport plane is usually provided with two or four engines, sometimes more, some or all of which must be located in outboard positions on the wing. If the fuel tank is housed in the fuselage, the expense and complication of the fuel system is increased.

For the reasons mentioned, various plans have been conceived to house the fuel tanks in the wings of the airplane, since this disposition not only makes the installation convenient for the engines, but the space ordinarily cannot be used for passengers or cargo. To install such tanks, and to permit their ready removal, a hole has been cut, in effect, from top to bottom of the wing, interrupting at least one skin and usually both skins, the rib cap strips at the bottom and usually at top and bottom, and all intermediate bracing between these cap strips. Naturally such a wing is weaker than if the hole were not left, and it must be strengthened. If the parts surrounding the hole are made stronger, so that no other or external bracing is required, the weight of the wing is greatly increased, as is also its cost. If the hole is bridged from edge to edge, the wing still is not as strong (without greatly added weight) as it would be if the ribs were unbroken, and such bridging usually requires external parts, interrupting the smooth airflow over the wing skins, and producing drag. It is usually considered necessary that the tank occupy all the space between the skins, to obtain the required capacity with the least horizontal area, and with, consequently, the fewest ribs interrupted, but such considerations only emphasize the necessity of external reinforcing and bridging members.

The arrangements discussed above have been proposed where it was considered desirable, as indeed it is, to relieve the tank of stress, and to assume all stresses in the wing structure. The greatly added weight required to accomplish such ends, and the imperfect accomplishment thereof, led to the incorporation of the tank itself into the wing structure, as a stress-bearing part thereof. This lessened the weight of the ribs, of the margin of the hole, and of bridging members, but introduced other difficulties. A tank for the carrying of fuel should not be subjected to stresses, for it is thereby rendered subject to failure, and leakage, from single undue stresses, from repeated stresses, or from unavoidable flexure found in every wing to a greater or less degree. Moreover, a tank of part-airfoil section, in fact any tank other than of round or near-round section, is inherently weak, and is in addition more expensive than a round section tank.

To avoid some of the disadvantages mentioned the wing was in some instances built around the fuel tank, so that the latter was permanently and irrevocably embodied within the wing. This construction made it very difficult to repair or to replace a defective tank, usually necessitating removal of part of the wing skin and structural members.

It is the principal object of our invention, therefore, to provide a fuel tank structure of a type which can be incorporated into a wing in lieu of the usual structural trusses or members which would be found in the cavity occupied by the tank, yet without requiring the remaining structural members to be of greater than normal strength or weight. The tank itself can be so designed that elements incorporated within it will withstand all or part of the stress to which the interrupted wing structural members would have been subjected, without injury to the tank, and without the tank itself being subjected to wing stresses. It therefore becomes unnecessary to increase appreciably the weight of the wing structure. The structural trusses through which the tank extends may be ribs or spars, or both, or any similar member which is to receive the tank.

It is a further object of our invention to provide such a tank which can be removed from the wing and again replaced therein with little difficulty, and especially without removal of the skin or integral structural parts of the wing itself, when it becomes necessary to inspect, repair or replace the tank.

More specifically it is an object of our tank to constitute a structure which will be rigid fore and aft, as is required, but as a result of which the tank itself will not be strained by the flexure of the wing along its length, permitted by the wing spars, notwithstanding that, in place, tank-carried members form part of the internal bracing of the wing.

It is an object to connect such a tank flexibly to the wing structure, yet to incorporate members within it to transmit stresses from one such point of connection to another, and thence to the wing structure; furthermore, to brace the tank, thus flexibly mounted, from the wing structure in a way to prevent swaying or vibration.

Another object of our invention is to provide a fuel tank having these characteristics, but one which can be manufactured easily and economically and of maximum inherent strength, because of its simple construction.

Our invention comprises the novel tank construction itself, as well as the manner in which it is incorporated into and cooperates with the wing structure, as shown in the drawings and described in the specification, the novel features of which are more particularly defined in the claims appended to the specification.

The drawings illustrate the preferred form of our tank construction and assembly, although various changes might be made therein for a particular installation.

Figure 1 is a rear elevation view of our tank, secured in the wing of an airplane.

Figure 2 is a transverse sectional view of the installation taken along the line 2—2 of Figure 1.

Figure 3 is a fragmentary sectional view, showing in detail the preferred form of connection between the tank and the wing structure, while Figure 4 is a side elevation of the same form, but of a connection located adjacent the center of the tank's length.

Figure 5 is a further detail view in plan of an installation on the tank of a connecting member.

Figure 6 is a detail section showing a modified form of connection, and Figure 7 is a similar view, taken at right angles, of another modified form.

The wing of the airplane may be constructed largely in the conventional manner. It may consist, for example, of a front spar 10 and a rear spar 11, to which are secured rib assemblies at spaced stations along the wing. The rib trusses may include cap strips 12 and interconnecting struts 13. The struts 13 will be secured to each other and to the cap strips 12 by gussets. Over the wing framework will normally be secured a stressed metal skin 1.

The metal fuel tank 2 will usually extend lengthwise of the wing, intersecting the planes of a number of structural trusses or ribs. These ribs will have no struts 13 extending between the cap strips over that portion of their length occupied by the tank. Since the tank is of large volume, to attain large cruising radius, to leave these portions of the ribs unsupported would dangerously weaken the wing structure. If the struts adjoining these openings were made sufficiently heavy to carry the load, however, the weight of the structure would be excessive.

In order to employ rib struts of the normal weight in a wing structure housing a fuel tank we have devised the unique metal tank construction illustrated. Within the tank 2, which, being round or near-round in cross section, is inherently strong, are incorporated stress-transmitting members, each located in the plane of one of the ribs, terminating at the tank's skin in anchorages which are accessible from without the tank, for its support. These stress-transmitting members may be built up in any conventional pattern, preferably complemental to the pattern of the struts 13, and represented as a series of N struts 20, spaced along the length of the tank at intervals corresponding to the spacing of the wing ribs. These N struts may be formed independently or as part of swash plates or bulkheads 6. The termini of the struts are secured to lugs 21 projecting from the exterior of the tank.

The particular structure of the lugs is seen best in Figures 3, 4, and 5. The lugs may be formed as part of an extrusion, integral with a knife-like plate 22 which extends through a slot in the wall of the tank 2, to be secured to the struts 20. Another plate or patch 23, also formed as part of the same extrusion, is bent to conform to the wall of the fuel tank and to lie thereover. These patches 23 are welded about their margins at W to the metal skin of the fuel tank, and are preferably star-shaped for better distribution of stresses likely to affect the weld. It will be seen that all stresses set up in the struts 20 or transmitted to them originate in the wing structure, and are carried directly through the plates 22 to the lugs 21, and no stress is therefore set up in the skin of the tank itself.

The lugs 21 are flexibly connected to fittings 25 secured to the cap strips 12. The link connection illustrated in Figures 1 to 4 is preferred. It is to be noted that the bolts interconnecting the lugs 21 and links 24, as well as those interconnecting the links 24 and the fittings 25, are parallel to the rib assembly. Hence there can be no pivotal movement of the links 24 in a fore and aft plane. In effect, therefore, the cap strips 12 above and below in the vicinity of the tank are interconnected by two sets of vertical struts, one at the forward side of the tank and the other at the rear side of the tank, each formed of an upper fitting 25, a link 24, a lug 21, a plate 22, a vertical member of the N strut 20, a lower lug 21, a lower link 24, and the lower fitting 25. Furthermore, in each set the forward and rear vertical struts are interconnected by the cross member of the N strut, extending from the top of the forward vertical member to the bottom of the rear vertical member. Thus a rigid structural assembly is formed within the tank itself at each rib station, and this assembly is directly interconnected with the rib assembly to form an operative part thereof. Neither the N-strut 20 nor the rib truss members need to be made heavier than if the rib trusses were not interrupted. It will be noted that the entire stress arising in the wing, from flexure, for example, is transmitted through the N strut, and not through the fuel tank shell.

Although the resulting structure is rigid in fore and aft planes, it is not rigid lengthwise of the wing. In flight such an airplane wing will flex appreciably throughout its length. The links 24, it will be seen, are free to swing in planes parallel to the length of the wing, and hence as the wing bends, no stress will be placed upon the members interconnecting the rib cap strips and the N struts within the tank, for the links will swing with respect to the lugs 21 and the fittings 25, as required by this movement of the wing.

This mounting, it will be seen, not only gives fore and aft rigidity to the wing, not found in other types of wing tank installation, but likewise leaves the metal tank sufficiently unrestrained lengthwise of the wing so that it will not be strained when the wing flexes, as a tank rigidly mounted within the wing might be. Although a slight freedom of movement lengthwise of the wing is permitted by reason of the link mounting, any appreciable shifting of the tank within the wing is prohibited by the provision of tie bars 26, which extend generally lengthwise of the wing and interconnect certain lugs 21 with fittings 27 secured in any suitable manner to the wing structure. It is preferred that the fittings 27 be located centrally of the tank's length, with tie bars 26 extending to adjacent lugs at each side.

The fuel tank will, of course, be provided with a suitable filling sleeve or funnel 3, and dump valve housed within the sleeve 4. Mechanism 5 will be provided for withdrawing fuel from the tank for delivery to the engine. The wing skin 1 is apertured for projection of the sleeves 3 and 4, and to permit some movement of the sleeves relative to the skin, as the wing flexes. Preferably packing means (not shown) will surround the sleeves at the skin, to prevent entrance of water or other matter.

Thus it will be seen that while the fuel tank may incorporate all the usual features of the conventional fuel tank, it may also advantageously serve to supplement the skeleton of the airplane wing, and particularly the rib assembly. With such an installation a light and efficient structure is formed. The tank is located adjacent the stub or root end of the wing, and may be removed from the wing without difficulty, when necessary, merely by removing the wing and disconnecting the bolts 28 from within the wing, or the bolts interconnecting either the lugs 21 and the links 24 or those interconnecting the links 24 and the fittings 25 may be removed. The whole tank may then be slid endwise from the wing. It is unnecessary to remove any of the wing skin 1.

The same results can be approximated by connections such as are illustrated in Figures 6 and 7. In Figure 6 the patch 2, carrying the plate 22, has formed upon it the lugs 21a, carrying a sleeve 7, vertically disposed. The head 25a, securable to the rib structure in the manner previously described, has a bolt 70 extending through the sleeve 7. A rubber sleeve 71 is interposed between the sleeve 7 and bolt 70, and a washer and nut at 72 on the lower end of the bolt engages the lower end of the rubber sleeve. The rubber sleeve being bonded to the outer sleeve 7, or being otherwise secured against vertical movement with respect thereto, the tank is supported from the rib structure, and can transmit stresses between the upper and lower cap strips. The arrangement in Figure 7 is similar, save that the sleeves 7b and 71b, and the bolt 70b are preferably placed lengthwise of the wing. Either such arrangement permits but limited fore and aft movement of the tank. By using rubber compositions of selected degrees of hardness or resilience, the intensity of the transmitted stresses may be varied or controlled at will.

What we claim as our invention is:

1. In combination with an aircraft structure internally braced against bending, torsional, and direct stress, but flexible in one direction, and having a cavity formed therein for admission of a tank, and extending for an appreciable length in the plane of the flexure, a rigid tank having internal means for translation of torsional and direct stresses separately of the tank, means for connecting the tank to the structure, said means being arranged and organized to transmit torsional and direct stress to said tank-carried means directly, and to flex in themselves, whereby to avoid transmission of a bending stress in the plane of flexure, between the structural members and the tank or the tank-carried members.

2. In combination with an aircraft structure internally braced against bending, torsional, and direct stress, and formed with a cavity for the reception of a tank, a tank and means within the tank for translation of torsional and direct stresses independently of the tank, means connecting the tank to the structure, and having provision for lost motion under the influence of bending stress, whereby such stress is not imposed upon the tank, but formed and disposed to transmit torsional and direct stress through said tank-carried means, but not to the tank.

3. In combination with an aircraft wing or the like flexible to a limited degree in a longitudinal vertical plane, and subject to torsional and direct stresses, said wing incorporating internal transverse ribs and longitudinal spars to resist and contain such stresses, and the trussing of a number of successive ribs being interrupted in part, to define a cavity, a rigid tank of considerable length as compared to its height and width, received within such cavity, a plurality of means within the tank, spaced apart lengthwise of the tank, to transmit direct and torsional stresses transversely of the tank, and terminating in external anchorages at opposite sides of the tank, and means to support the tank from the wing structure by such anchorages, said means being arranged and organized to prevent transmission to the tank-carried means of flexure from the wing, and to transmit only direct and torsional stresses, whereby the tank-carried means complement the interrupted trusses of the ribs for direct and torsional stresses, but are incapable of transmitting flexure.

4. In combination with an aircraft structure having internal bracing and an uninterrupted skin, a tank enclosed therein, means interconnecting said tank and structure, said means being non-flexible transversely and flexible lengthwise with respect to the tank, means within the tank for transmission of certain stresses, said interconnecting means and tank means being so formed and disposed as to prevent stress in the tank.

5. In combination with an internally braced aircraft structure which includes primary load-supporting beams and secondary trusses disposed transversely upon and spaced lengthwise of the beams, and a skin extending uninterruptedly about the skeleton thus formed, a metal tank of near-cylindrical shape in cross-section, disposed alongside and lengthwise of a beam, and spaced inwardly from the skin of the aircraft structure, and interrupting a plurality of secondary trusses, means secured to and disposed at opposite sides of the tank, in the vicinity of interrupted trusses, complemental means carried by such interrupted trusses and engageable with the tank-carried means for transmission of stresses to the latter, in a direction transversely of the tank, but said complemental means and their connections being organized for flexure in a direction lengthwise thereof, and of the beams, to avoid transmissions of flexure between the beams and the tank or the tank-carried means, and means within the tank, substantially coinciding in position and in arrangement to the interrupted trusses, connecting the tank-carried means at opposite sides of the tank, for transmission of transverse stresses from the interrupted trusses at one side to the same trusses at the opposite side of the tank, substantially in the manner such stresses would be transmitted if such trusses were not interrupted.

6. In combination with an internally braced aircraft structure which includes a longitudinal beam and transverse trusses spaced therealong, and which in use is subject to flexure in a vertical plane lengthwise of the beam, a tank disposed within the structure and lengthwise of the beam, and interrupting a plurality of transverse trusses, means carried by interrupted trusses, above and below the tank, complemental means carried by the tank, the truss-carried means being connected to the tank-carried means for relative movement in the plane of flexure of the beam, but transmitting to the latter stresses in transverse planes, and truss elements incorporated within the tank, lying in the general plane of the interrupted truss elements, and extending between the tank-carried means at the top and bottom of the tank respectively, for transmission from one to the other of such transverse stresses, the relative movement between the truss-carried means and the tank-carried means relieving the tank and its truss elements from stresses due to flexure of the beams.

7. In combination with an internally braced airplane wing or the like, certain structural members of which are interrupted to define a longitudinal cavity, a fuel tank of near-circular cross-section received in the cavity, means for removably supporting the tank in such structure comprising lugs projecting through the tank's skin, and sealed thereto, internal bracing secured to the internal portion of said lugs for transmission of stresses from one lug to another, and separable links pivotally secured to the external portion of said lugs and to the wing structure, and disposed, with relation to the direction of flight, to prevent fore-and-aft movement of the tank relative to the wing structure, while still permitting a limited relative movement longitudinally of the wing.

8. In combination with an internally braced structure, a tank enclosed therein, lugs mounted upon the tank, lugs mounted upon the structure, each adjacent one of the tank-carried lugs, and means connecting all such lugs in pairs for relative movement in a direction lengthwise of the tank, but for transmission of stress transversely of the tank, and means structurally independent of the tank for transmission of stress from tank-carried lugs at one side of the tank to similar lugs at another side of the tank.

9. In combination with an internally braced structure, a tank enclosed therein, lugs mounted upon the tank, lugs mounted upon the structure, each adjacent one of the tank-carried lugs, and links pivotally connecting all such lugs in pairs, the pivot axes of all such connections extending generally transversely of the tank, for relative movement of the paired lugs in a direction lengthwise of the tank, but for transmission of stress transversely of the tank, and means within but structurally independent of the tank for transmission of stress from tank-carried lugs at one side of the tank to similar lugs at another side of the tank, and thence back to the structure there connected to the latter tank-carried lug.

10. In combination with an internally braced structure, a tank enclosed therein, lugs mounted upon the tank, lugs mounted upon the structure, each adjacent one of the tank-carried lugs, and links pivotally connecting all such lugs in pairs, the pivot axes of all such connections extending generally transversely of the tank, for relative movement of the paired lugs in a direction lengthwise of the tank, but for transmission of stress transversely of the tank, and means within but structurally independent of the tank for transmission of stress from tank-carried lugs at one side of the tank to similar lugs at another side of the tank, and thence back to the structure there connected to the latter tank-carried lug, and rods extending from tank-carried lugs lengthwise of the tank to structure-mounted lugs, to restrict longitudinal movement of the tank with respect to the structure.

11. A fuel tank for mounting in an airplane wing or the like, comprising a skin, truss members within the tank in a plurality of transverse planes, lugs secured externally of the tank, above and below, in each such plane, and each having a plate extending through an opening provided in the tank's skin, a patch secured to the skin about each such opening to seal it, the truss members being secured only to the internally projecting plates, for transmission of direct and torsional stresses directly from an external lug at one side of the tank to a second external lug at the other side, without application of such stresses to the tank skin.

12. A fuel tank for mounting in an airplane wing or the like, comprising a skin, truss members within the tank in a plurality of transverse planes, lugs secured externally of the tank, above and below each such plane, and each having a plate extending through an opening provided in the tank's skin, a patch secured to the skin about each such opening to seal it, the truss members being secured only to the internally projecting plates, for transmission of direct and torsional stresses directly from an external lug at one side of the tank to a second external lug at the other side, without application of such stresses to the tank skin, and links pivotally connected to each external lug, the pivot axes lying in the planes of the internal truss members.

EDWIN A. HUGHES.
ROBERT J. MINSHALL.